No. 621,273.  
C. NELSON.  
ICE CREAM CABINET.  
(Application filed Dec. 18, 1897.)

(No Model.)

Patented Mar. 14, 1899.

WITNESSES  
Alfred A. Mathey  
R. E. Elliott

INVENTOR  
Charles Nelson  
BY  
Weller & Weller  
ATTORNEYS.

UNITED STATES PATENT OFFICE.

CHARLES NELSON, OF ST. LOUIS, MISSOURI.

ICE-CREAM CABINET.

SPECIFICATION forming part of Letters Patent No. 621,273, dated March 14, 1899.

Application filed December 18, 1897. Serial No. 662,474. (No model.)

*To all whom it may concern:*

Be it known that I, CHARLES NELSON, a citizen of the United States, residing at St. Louis, in the State of Missouri, have invented certain new and useful Improvements in Ice-Cream Cabinets, of which the following is a full, clear, and exact description, reference being had to the accompanying drawings, forming a part thereof.

My invention has relation to improvements in ice-cream cabinets; and it consists in the novel combination and arrangement of parts, as will be hereinafter more fully described in the specification and pointed out in the claim.

Figure 1:
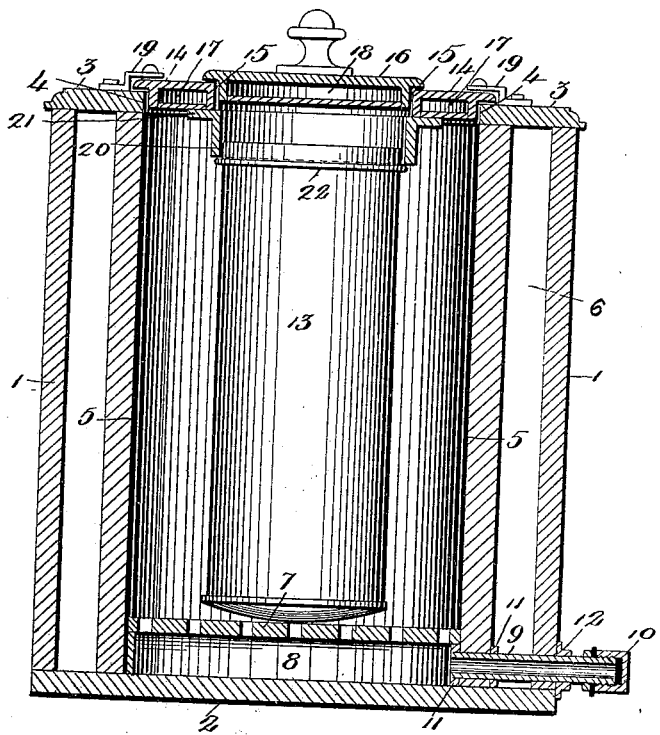
Figure 2:
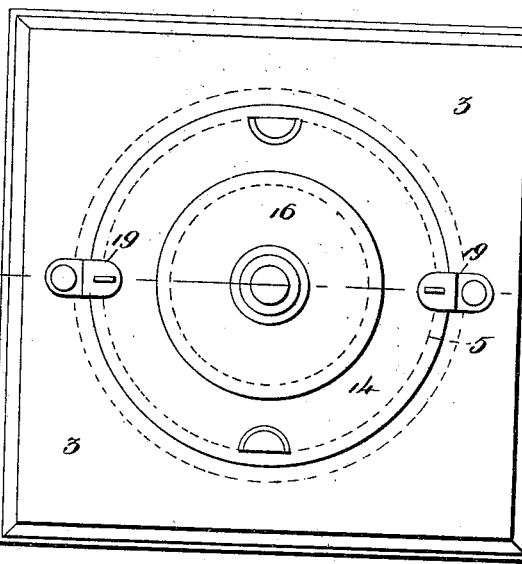
Figure 3:
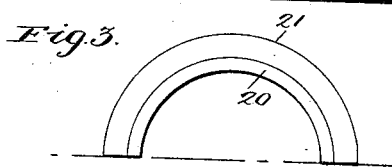

In the drawings, Figure 1 is a vertical longitudinal section of my complete invention, taken on the line $x$ $x$ of Fig. 2. Fig. 2 is a top plan view of the same, and Fig. 3 is a bottom plan view of one-half of the holding-ring.

The object of my invention is to construct an ice-cream cabinet which will preserve the proper solidity of the ice-cream for any length of time, consuming a comparatively small quantity of ice or less than those previously constructed, and, further, to provide a durable cabinet—that is, one that will last an indefinite length of time or withstand the rough usage to which it is necessarily subjected through constant handling.

In constructing the cabinet I employ wood almost exclusively, and especially for the inner ice chest or chamber, which is constructed in the form of a cylinder and forms a concentric circle with the cylindrical can containing the ice-cream, which has been formed to give far better results than the employment of a rectangular metallic ice-chest, from the fact that there is an even distribution of the ice encircling the can, and consequently all the ice-cream contained in the can is kept at an even temperature.

Briefly stated, the invention consists of an outer rectangular box or cabinet of suitable dimensions and constructed, preferably, of wood, a large circular opening in the top of the chest, an inner cylindrical ice-chamber made exclusively of wood, the inside circular dimensions of which correspond with the size of the said opening, a perforated bottom located within said ice-chamber and located a suitable distance above the bottom of the cabinet, leaving below it a cold-water receptacle, and upon which perforated bottom the ice-cream can rests, a pipe leading from said cold-water receptacle and having its outer end provided with a removable cap, a large circular covering for covering the ice-chamber and having a circular dry-air space, a central circular opening formed in said cover and adapted to be covered with a lid also having a dry-air space, means for holding the large circular cover on the chest, and a ring encircling the ice-cream can and interposed between the flange of the latter and the under surface of the large circular cover, and in other details in the construction, as will be hereinafter more particularly described.

Referring to the drawings, 1 represents a rectangular cabinet or box made, preferably, of wood and having a bottom 2 and top 3, the said top being provided with a circular opening 4, through which the ice is inserted. The ice-chamber 5 is constructed entirely of wood of suitable thickness and is circular in cross-section, the inner wall of which corresponds in size to the opening 4 of the top 3 of the cabinet, whereby a space 6 is left between the inner walls of the cabinet and the outer cylindrical wall of the ice-chamber, which may be packed with mineral wool or other similar material to resist the action of heat, which would otherwise come in contact with the ice-chamber. The inside circular wall of the ice-chamber may be coated with any well-known compound which will resist the action of water for preventing the wood from absorbing the same, thereby preserving the wood and causing it to remain light and durable, and will therefore last an indefinite length of time. Located and fixed within the ice-chamber 5, at a suitable distance from the bottom 2 of the cabinet 1, is a perforated bottom or partition 7, forming below the same a cold-water receptacle 8 for receiving the water from the ice located above the same. Passing through one of the side walls of the cabinet and through the cylindrical ice-chamber 5 below the perforated partition 7 is a drain-pipe 9, which projects a suitable distance beyond said wall of the cabinet and is screw-threaded, over which end is screwed a plug 10 for holding the water within the receptacle 8 until it becomes necessary to release the same. In order to securely and rigidly fasten the drain-pipe, nuts 11 11 are passed on the pipe against the outer and inner circular walls of the ice-chamber 5, and an additional washer 12 is fastened to the outside of the cabinet and snugly encircling the pipe 9.

The upper surface of the perforated partition 7 is adapted to support the ice-cream can 13, which is centrally located within the ice-chamber 5, in a manner hereinafter to be described.

14 represents a large circular flanged cover of a size to cover the ice-chamber 5 and provided with a central circular opening 15. The circular opening 15 of the cover 14 is, however, covered by a lid 16 for gaining access to the ice-cream located within the ice-cream can 13 without uncovering the ice, which is packed between said can and the inner cylindrical wall of the ice-chamber. The large circular cover is provided with a dry-air annular space 17, and the lid 16 is also provided with a dry-air space 18, which serve to prevent condensation on the outside or upper surfaces of the same, thus keeping the cover and lid perfectly dry. In order to hold the circular cover 14 down in its proper position on the top of the cabinet 1, as shown in Fig. 1, pivoted annular fastening devices 19 are employed, which coöperate with the upper surface of said cover.

20 represents a circular collar or band provided with a flange 21 of a size to freely receive and embrace the upper portion of the ice-cream can 13, the lower edge of which rests upon the annular flange 22 of said can, and its flange portion 21 being in contact with the under surface of the circular cover 14, whereby the outside air is prevented from coming in contact with the ice located in the ice-chamber 5 during the constant and repeated removal of the lid 16, and, further, prevents the ice-cream from crystallizing about the upper portion of the can.

The wall constituting the ice-chamber 5, and which, as before stated, is composed wholly of wood, is preferably made up of a series of thick bars of white cedar, each of which is properly formed in order that when they are assembled or brought together a water-tight circular chamber is formed, resembling a barrel.

A cabinet constructed as described is not only durable and light, but will outlast any and all previously constructed, from the fact that heretofore the ice-chamber has been constructed of sheet metal, which easily becomes distorted and destroyed, thereby allowing the water to leak from the cabinet, and thus render the same useless. It is impossible for this to happen by my construction of ice-chamber, and it will readily be seen that it will preserve the ice contained therein a greater length of time and the economy of ice will be greatly appreciated.

Having fully described my invention, what I claim is—

An ice-cream cabinet comprising an outer box having a bottom and a top provided with a circular opening, an ice-chamber composed entirely of wood, the inner wall of which corresponds in size to said opening, whereby a space is formed between said chamber and box, a perforated bottom located in said chamber, and secured to the same at a suitable distance from the bottom of the box upon which the ice-cream can is adapted to rest, a cold-water receptacle formed by said partition at the bottom of the ice-chamber, a suitable drain-pipe leading from said receptacle, means for closing the outer end of said pipe, a large circular flanged cover provided with a central opening adapted to partially cover the said chamber, fastening devices for holding said cover in position, and a lid for covering the opening in the circular cover, as and for the purpose described.

In testimony whereof I affix my signature in presence of two witnesses.

CHARLES NELSON.

Witnesses:
ALFRED A. MATHEY,
C. F. KELLER.